(12) United States Patent
Nakata

(10) Patent No.: US 7,796,635 B2
(45) Date of Patent: Sep. 14, 2010

(54) TRANSMISSION SYSTEM AND METHOD FOR ASSIGNING TRANSMISSION CHANNEL

(75) Inventor: Toru Nakata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 12/278,024

(22) PCT Filed: Jan. 30, 2007

(86) PCT No.: PCT/JP2007/051855
§ 371 (c)(1),
(2), (4) Date: Aug. 1, 2008

(87) PCT Pub. No.: WO2007/088993
PCT Pub. Date: Aug. 9, 2007

(65) Prior Publication Data
US 2009/0064250 A1    Mar. 5, 2009

(30) Foreign Application Priority Data
Feb. 3, 2006    (JP)    .............................. 2006-027711

(51) Int. Cl.
*H04J 3/16*    (2006.01)
(52) U.S. Cl. .................................................... 370/437
(58) Field of Classification Search .................. None
See application file for complete search history.

(56) References Cited
U.S. PATENT DOCUMENTS
7,142,864 B2 * 11/2006 Laroia et al. ................ 370/431

| 2002/0003787 A1 | 1/2002 | Hayama et al. |
| 2004/0250195 A1 * | 12/2004 | Toriumi ...................... 714/758 |
| 2006/0072519 A1 | 4/2006 | Hayama et al. |

FOREIGN PATENT DOCUMENTS

| JP | 09/037339 A | 2/1997 |
| JP | 10-257097 A | 9/1998 |
| JP | 2002-095065 A | 3/2002 |
| JP | 2005-236416 A | 9/2005 |
| WO | 2004/095851 A2 | 11/2004 |

OTHER PUBLICATIONS

International Search Report issued on Apr. 17, 2007 for International Application No. PCT/JP2007/051855.

* cited by examiner

*Primary Examiner*—Anh-Vu Ly
(74) *Attorney, Agent, or Firm*—Canon U.S.A., Inc. I.P. Division

(57) ABSTRACT

A transmission terminal measures an error rate by periodically transmitting an error rate measuring packet to all transmission channels and all transmission paths. Content to be transmitted is classified, so that a transmission channel of the best transmission quality is assigned to content requiring real-timeness and a wide transmission bandwidth. According to the type of the content, a required communication protocol is selected to perform processing thereof. The transmission bandwidth for the content requiring a wide transmission bandwidth is assigned at a peak rate, while the transmission bandwidth for the content requiring a narrow transmission bandwidth is assigned at an average rate.

11 Claims, 6 Drawing Sheets

FIG. 5

| TRANSMISSION QUALITY GUARANTEE LEVEL | FREQUENCY CHANNEL | CONTENT | MAXIMUM BANDWIDTH USAGE | BANDWIDTH CALCULATION METHOD | NET ERROR RATE | CHANNEL CHARACTERISTICS |
|---|---|---|---|---|---|---|
| 1 | f1 | HD VIDEO (UDP) | 80~100% | CALCULATE AT PEAK RATE | GOOD | MINIMIZED CONGESTION |
| 2 | f2 | SD VIDEO (UDP/TCP), CONTROL DATA (TCP) | 80% | CALCULATE AT AVERAGE RATE | FAIR | NOT MUCH CONGESTION |
| 3 | f3 | DATA(TCP) | 100% | | BAD | MUCH CONGESTION |

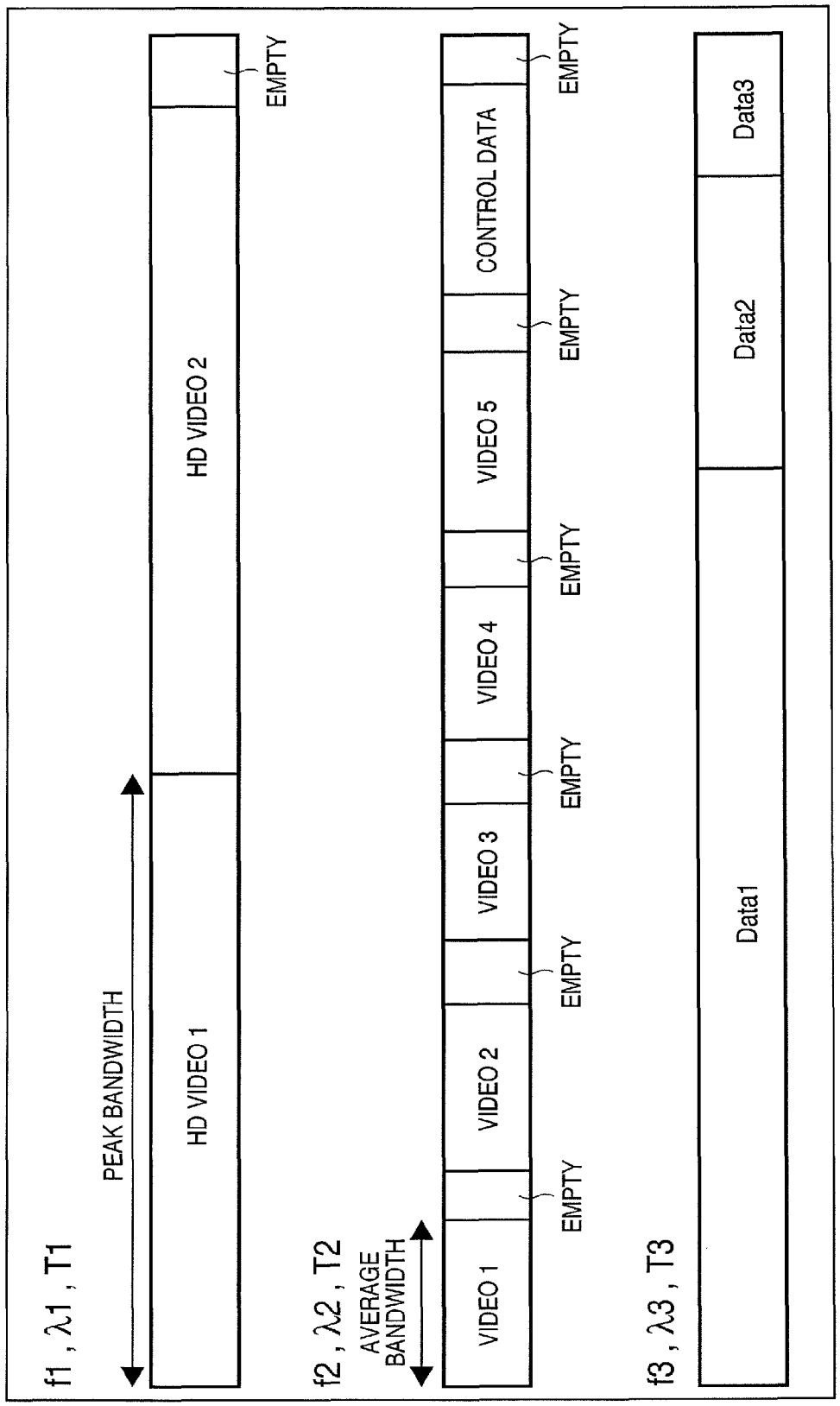

TRANSMISSION SYSTEM AND METHOD FOR ASSIGNING TRANSMISSION CHANNEL

TECHNICAL FIELD

The present invention relates to techniques for ensuring transmission quality in a transmission system.

BACKGROUND ART

Today, with the start of terrestrial digital broadcasting services, the television system is shifting from SDTV to the finer HDTV. SDTV stands for Standard Definition Television, and HDTV stands for High Definition Television. In addition, opportunities to work with HD video at home are increasing for reasons such as inexpensive general-purpose HD (High Definition) cameras becoming commercially available. There is a need to store the content of digital broadcasting and video taken by HD cameras in a storage device at home to be shared among family members and watch the content and HD video on each member's PC (Personal Computer) at the desired times. Therefore, a network is often established at home for accessing the storage device containing the content and HD video from each member's PC.

For the network at home (home network), a wired LAN (Local Area Network) such as Ethernet (R) or a wireless LAN defined by IEEE 802.11x is currently used. Typically, using a wireless LAN to configure the home network is preferably desired, because the wired LAN requires efforts to place cables inside the house.

However, since a wireless LAN has a transmission bandwidth not as wide as that of the wired LAN, it frequently causes transmission errors when HD video is transmitted, due to the occurrence of delays and the interference of radio waves under the influence of other traffic. These transmission errors are inherently caused and cannot be prevented, so that packets lost by the transmission errors are typically retransmitted. However, for content requiring a wide transmission bandwidth and real-timeness, such as HD video, retransmission is not completed by the time for video display. As a result, seamless video cannot be displayed.

One method for suppressing the occurrence of the transmission errors is to increase the transmission power (for example, Patent Documents: US Publication Nos. and 2002-003787 corresponding to Japanese Patent Application Laid-Open No. 2002-95065).

However, increasing the transmission power poses problems such as interfering with other wireless communications within the same frequency.

DISCLOSURE OF INVENTION

An object of the present invention is to effectively use communication bandwidths of a plurality of transmission channels and transmit content.

Another object of the present invention is to effectively use communication bandwidths of a plurality of transmission channels and minimize degradation in image quality, especially for transmission of high-definition video.

To achieve the above objects, according to an aspect of the present invention, there is provided a transmission system in which content is transmitted by selecting at least one of a plurality of transmission channels, comprising:

detection means for detecting transmission quality of a plurality of transmission channels;

recognition means for recognizing transmission quality appropriate for content to be transmitted; and requesting means for making a request, to transmission channel management means that manages transmission channels in the transmission system, for assignment of a transmission channel to be assigned to the content to be transmitted based on the transmission quality recognized by the recognition means and the transmission quality of the plurality of transmission channels detected by the detection means.

According to another aspect of the present invention, there is provided a method for assigning a transmission channel in a transmission system, comprising the steps of:

recognizing transmission quality of each of a plurality of transmission channels; and assigning a transmission channel of the recognized transmission quality according to a type of content to be transmitted.

Further features of the present invention will become apparent from the following description of exemplary embodiments with reference to the attached drawings.

BRIEF DESCRIPTION OF DRAWINGS

FIG. 5 is a diagram showing the relationship between transmission quality guarantee levels and frequency channels in the embodiment; and FIG. 6 is a diagram showing a plurality of pieces of information multiplexed and transmitted between the access point and a plurality of wireless terminals.

BEST MODE FOR CARRYING OUT THE INVENTION

The best mode for carrying out the present invention will be described in detail below with reference to the drawings.

Multiplex Transmission System

Figure 1:
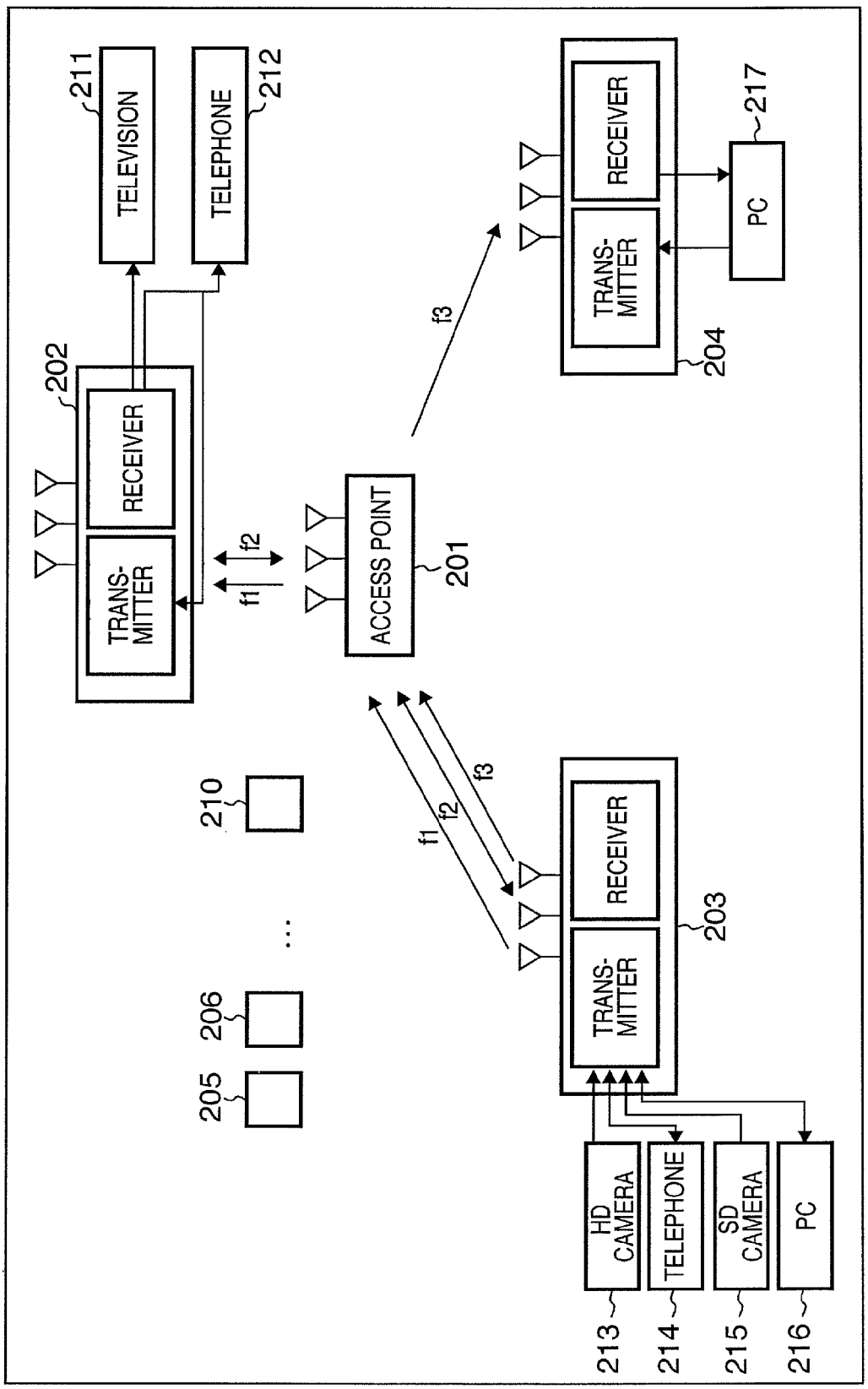
FIG. 1 is a diagram showing an exemplary network configuration of a multiplex transmission system.

First, the network configuration of a multiplex transmission system will be described using FIG. 1. FIG. 1 is a diagram showing an exemplary network configuration of the multiplex transmission system. In FIG. 1, reference numeral 201 denotes an access point with wireless LAN functions defined by IEEE 802.11x, which relays wireless communications between wireless terminals. The access point 201 operates like 3×3 switches, where it converts input signals of frequencies f1, f2, and f3 into signals of certain frequencies and outputs the signals. The access point 201 also manages traffic and the bandwidth in the entire network, while wireless terminals obtain transmission rights and perform communications under instructions of the access point 201.

Reference numerals 202 to 210 denote the wireless terminals respectively, which connect various apparatuses such as an HD camera 213, telephones 212 and 214, an SD camera 215, and PCs 216 and 217 with each other by radio signals. Here, each of the wireless terminals 202 to 210 includes a transmitter (FIG. 2) and a receiver (FIG. 3), each of which has certain apparatuses connected thereto.

It is assumed here that the wireless terminal 202 has a television 211 and the telephone 212 connected thereto, the wireless terminal 203 has the HD camera 213, the telephone 214, the SD camera 215, and the PC 216 connected thereto, and the wireless terminal 204 has the PC 217 connected thereto. It is also assumed that the wireless terminals 205 to 210 have apparatuses such as cameras and PCs (not shown) connected thereto.

[Configuration of Wireless Terminal]

Next, using FIGS. 2 and 3, description will be given of the configuration of the transmitter and then the receiver of the above-described wireless terminals 202 to 210. It is assumed here that each wireless terminal has both the transmitter and the receiver, where the transmitter is connected to apparatuses such as cameras, telephones, and PCs to receive inputs of information such as video, voice, and data from the apparatuses.

Figure 2:
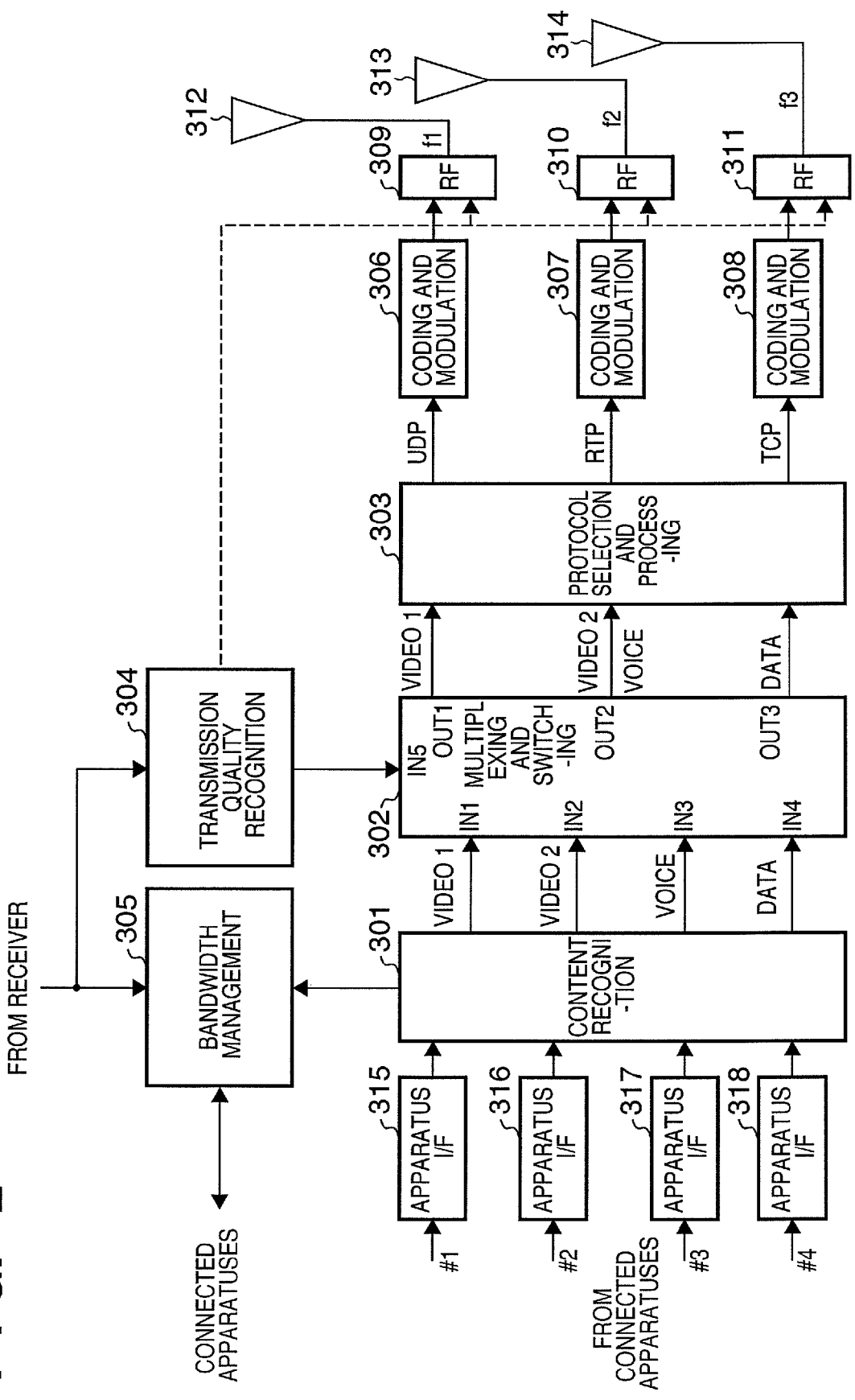
FIG. 2 is a diagram showing an exemplary configuration of a transmitter of a wireless terminal in an embodiment.

FIG. 2 is a diagram showing an exemplary configuration of the transmitter of the wireless terminals in an embodiment. As shown in FIG. 2, there are four input lines #1, #2, #3, and #4, through which four pieces of information are input to apparatus I/Fs 315 to 318. The apparatus I/Fs 315 to 318 convert the information input from the respective connected apparatuses into a certain signal format and transfer the information to a content type recognition unit 301. The content type recognition unit 301 determines whether each of the input information is video, voice, or data and further determines a required transmission bandwidth and whether real-timeness is required or not.

For example, the content type recognition unit 301 classifies the input information into the following three types:
  video information that requires a wide bandwidth and real-timeness, such as HD video (video 1),
  stream data that requires a relatively narrow bandwidth and real-timeness, as in the cases of the Internet telephone and video/voice distribution (video 2 and voice), and
  data that does not permit transmission errors and requires retransmission of information on the occurrence of errors to ensure delivery of all information, as in the case of data communication (data).

Here, the above-mentioned #1 is classified as video 1, #2 is classified as video 2, #3 is classified as voice, and #4 is classified as data. This classification information is provided to a bandwidth management unit 305. Instead of being determined from the input information in the content type recognition unit 301, this classification information may be provided in advance from the connected apparatuses to the bandwidth management unit 305. In that case, the classification information is predetermined for the connected apparatuses.

Next, a multiplexing and switching unit 302 receives inputs of the information on the video 1, video 2, voice, and data recognized in the content type recognition unit 301 and multiplexes the same type of information. The multiplexing and switching unit 302 consists of 5×3 switches, where input information may be output to any of output terminals. That is, since the video 2 and the voice input from IN2 and IN3 are the same type of information among five inputs (IN1 to IN5), they are multiplexed and output to an output terminal OUT2. The video 1 input from IN1 and the data input from IN4 are output to output terminals OUT1 and OUT3 respectively and passed to a protocol selection and processing unit 303. An input terminal IN5 will be described in detail in connection with a transmission quality recognition unit 304 described below.

Next, the protocol selection and processing unit 303 selects protocols required for the input information and performs processing thereof. For example, video that requires a wide bandwidth and real-timeness, such as HD video, is processed according to a protocol such as UDP (User Datagram Protocol). A data stream that requires a relatively narrow bandwidth and real-timeness, as in the cases of the Internet telephone and video/audio distribution, is processed according to a protocol such as RTP (Real-time Transport Protocol). Communication that does not permit transmission errors and requires retransmission of information on the occurrence of errors to ensure delivery of all information, such as data communication, is processed according to a protocol such as TCP (Transmission Control Protocol). Processing according to a lower-layer protocol for these protocols, such as IP (Internet Protocol) or MAC (Media Access Control), may also be performed.

Specifically, the video 1 is subjected to UDP/MAC processing, the video 2 and voice are subjected to RTP/UDP/MAC processing, and the data is subjected to TCP/MAC processing. The signals subjected to these protocol processing are then subjected to coding such as scrambling and modulated according to various wireless schemes in coding and modulation units 306 to 308. RF units 309 to 311 set the frequencies of the signals from the coding and modulation units 306 to 308 to any of frequencies f1 to f3 under the control of the transmission quality recognition unit 304, and transmit the respective signals as radio signals from antennas 312 to 314.

To check the transmission quality of available transmission channels (frequency channels), the transmission quality recognition unit 304 periodically generates transmission quality checking packets and outputs them to the input terminal IN5 in the multiplexing and switching unit 302. These packets output from the output terminals OUT1, OUT2, and OUT3 in the multiplexing and switching unit 302 are transmitted via the protocol selection and processing unit 303, the coding and modulation units 306 to 308, the RF units 309 to 311, and the antennas 312 to 314 respectively.

The above transmission quality checking packets are transmitted to the access point 201 managing the transmission quality of the wireless network. The access point 201 receives these packets, detects transmission errors by calculating error detection codes appended to the packets, and returns the detection result to the sender terminal. The receiver in the sender terminal receives the packets containing the detection result, and the transmission quality recognition unit 304 is informed of the detection result and recognizes which frequency band has a better error rate. Here, for example, if the frequency f1 has the best error rate followed by the frequency f2 and then the frequency f3, the frequency for the RF unit 309 through which the video 1 is transmitted is set to f1. Likewise, the frequency for the RF unit 310 is set to f2, and the frequency for the RF unit 311 is set to f3.

Instead of the transmission quality checking packets sent by the transmission quality recognition unit 304, error information derived from the transmission quality history of packets in past communications may be returned to the sender terminal to determine the transmission quality.

In addition, instead of being transmitted periodically, the transmission quality checking packets may be transmitted to detect the transmission quality at appropriate times before communications are started.

The access point 201 further manages the communication bandwidth in the wireless network. In response to a communication request from a sender terminal, the access point 201 determines whether or not there is availability in the bandwidth and informs the bandwidth management unit 305 in the sender terminal of the determination result. The bandwidth management unit 305 controls the connected apparatuses based on the determination result.

Figure 3:
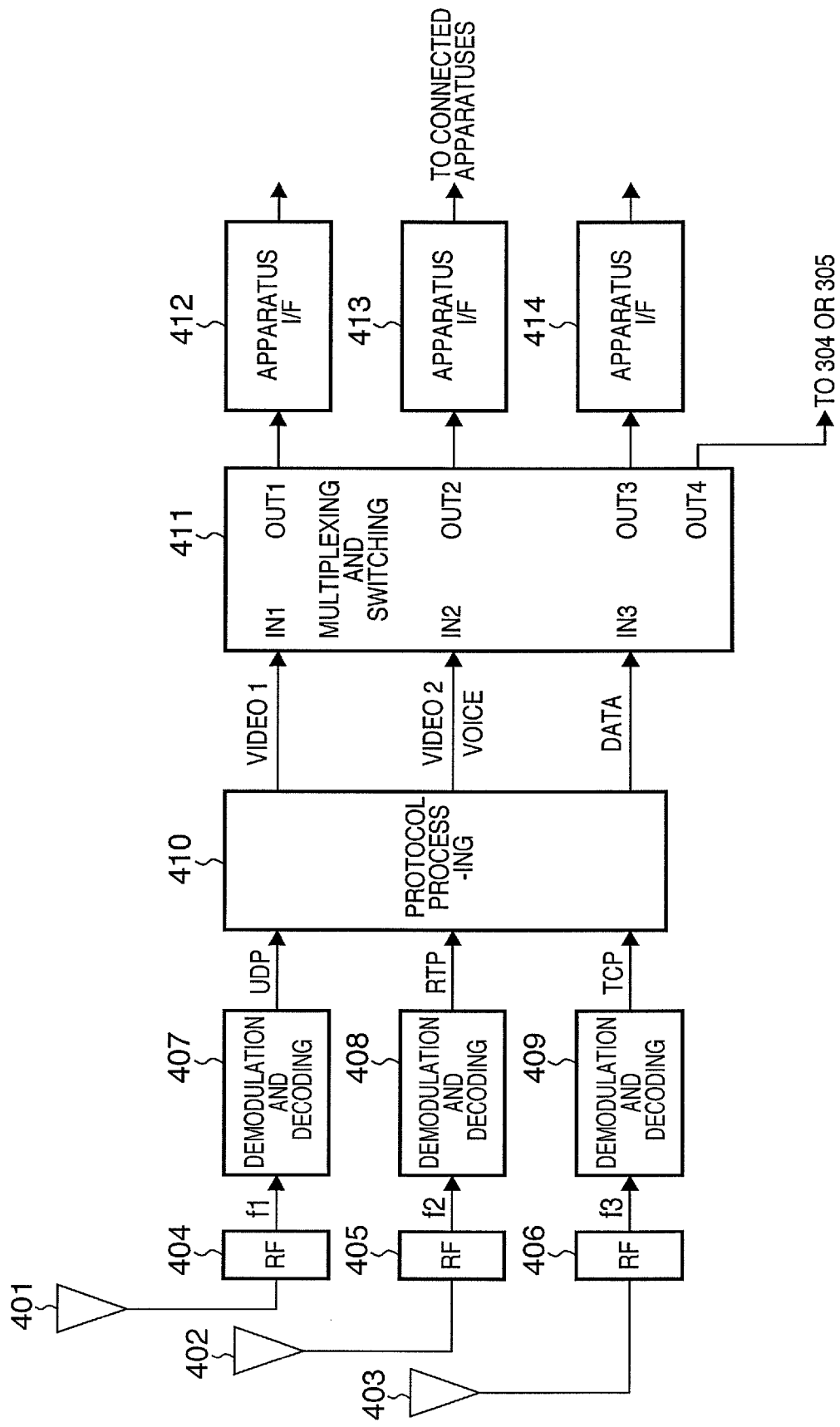
FIG. 3 is a diagram showing an exemplary configuration of a receiver of the wireless terminal in the embodiment.

FIG. 3 is a diagram showing an exemplary configuration of the receiver of the wireless terminals in the embodiment. As shown in FIG. 3, antennas 401 to 403 receive radio signals of the frequencies f1, f2, and f3 transmitted by sender terminals, respectively. Although these antennas are described here as separate from the antennas 312 to 314 in the transmitter, common antennas are typically used as both the transmitting antennas and the receiving antennas.

RF units 404 to 406 are set to receive signals of the frequencies f1, f2, and f3, thereby extracting these signals from the radio signals. Demodulation and decoding units 407 to 409 demodulate and decode the modulated and coded signals and output the signals to a protocol processing unit 410. The protocol processing unit 410 performs protocol processing on the input signals. Here, the video 1 on the frequency channel f1 is subjected to UDP/MAC processing, the video 2 and voice on the frequency channel f2 are subjected to RTP/UDP/MAC processing, and the data on the frequency channel f3 is subjected to TCP/MAC processing.

Next, the signals subjected to the protocol processing are output to a switching unit 411. For example, the switching unit 411 consists of 3×4 switches, where signals input to input terminals IN1, IN2, and IN3 are output to any of output terminals OUT1 to OUT 4. The signals output to the output terminals OUT1 to OUT3 are transmitted to a television, telephone, and PC connected via apparatus I/Fs 412 to 414. In addition, management packets transmitted by the access point 201 in response to the transmission quality checking packets transmitted by sender terminals are output to the output terminal OUT4 and transferred to the transmission quality recognition unit 304 or the bandwidth management unit 305.

[Configuration of Access Point]

Figure 4:
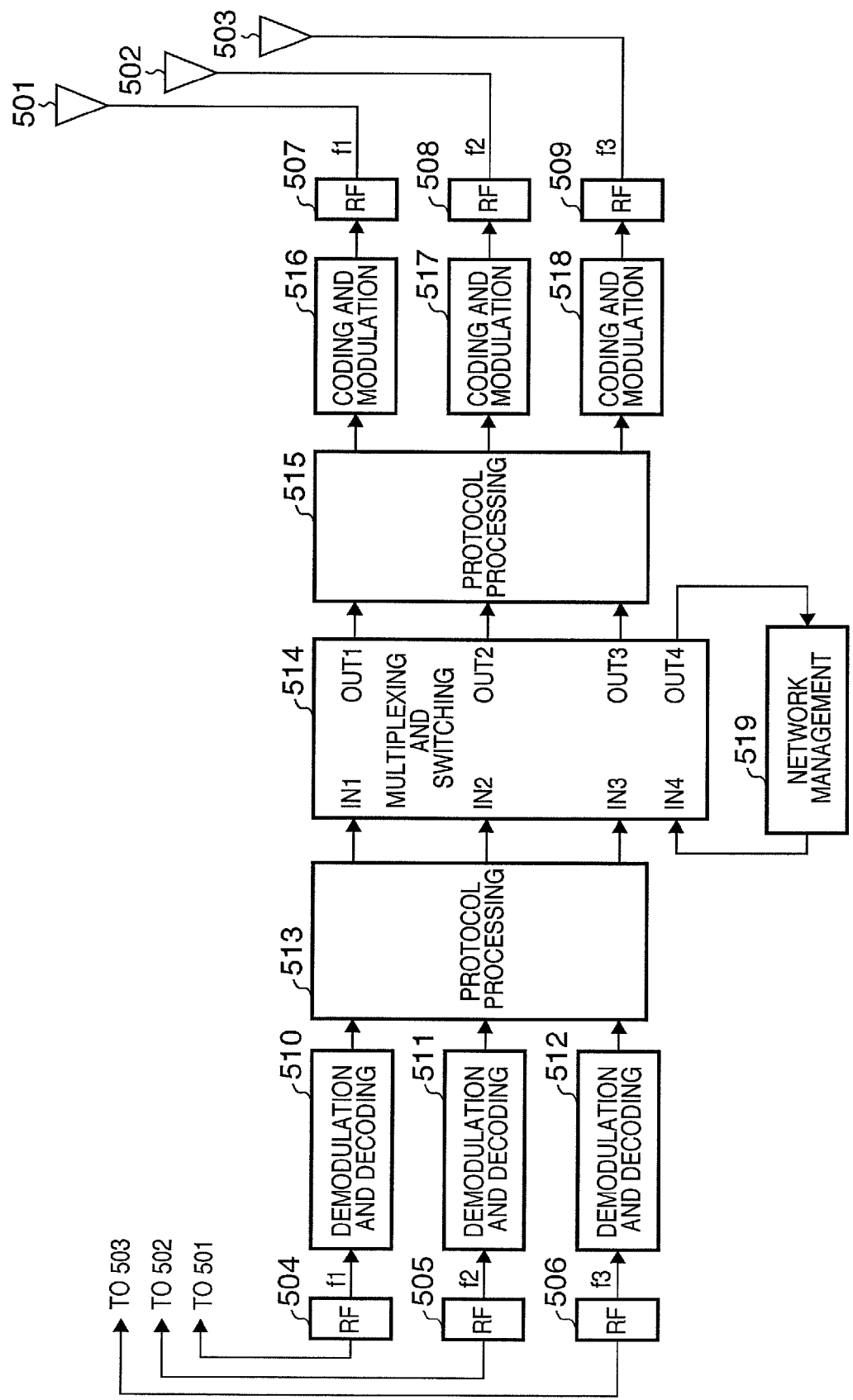
FIG. 4 is a diagram showing an exemplary configuration of an access point in the embodiment.

Now, the configuration of the access point 201 shown in FIG. 1 will be described using FIG. 4. FIG. 4 is a diagram showing an exemplary configuration of the access point in the embodiment. As shown in FIG. 4, antennas 501 to 503 transmit and receive radio signals of the frequencies f1, f2, and f3 respectively.

RF units 504 to 506 are set to receive signals of the frequencies f1, f2, and f3, thereby extracting these signals from the radio signals. Demodulation and decoding units 510 to 512 demodulate and decode the modulated and coded signals and output the signals to a protocol processing unit 513. The protocol processing unit 513 performs protocol processing on the input signals.

Next, the signals subjected to the protocol processing are output to a switching unit 514. For example, the switching unit 514 consists of 4×4 switches, where signals input to input terminals IN1, IN2, IN3, and IN4 are output to any of output terminals OUT1 to OUT 4. The signals output to the output terminals OUT1 to OUT3 are subjected to protocol processing in a protocol processing unit 515 and then coded and modulated in a coding and modulation units 516 to 518. RF units 507 to 509 set the frequencies of the signals from the coding and modulation units 516 to 518 to the frequencies f1, f2, and f3 respectively and transmit the signals as radio signals from the antennas 501 to 503. In addition, the transmission quality checking packets transmitted by sender terminals are output from the output terminal OUT4 and transferred to a network management unit 519.

The network management unit 519 receives the transmission quality checking packets periodically transmitted by sender terminals, detects transmission errors by calculating error detection codes appended to the packets, and measures their error rate. The network management unit 519 then generates the management packets containing the error rate information and outputs the management packets to the input terminal IN4 in the switching unit 514. The management packets are output from the output terminals OUT1, OUT2, and OUT3 respectively. These management packets are transmitted, via the protocol processing unit 515, the coding and modulation units 516 to 518, the RF units 507 to 509, and the antennas 501 to 503, to the transmission quality recognition unit 304 in the sender terminals that have transmitted the transmission quality checking packets. The sender terminals, having received the management packets on different frequency channels respectively, recognize the error rate of the frequency channels.

The access point 201 also manages the communication bandwidth in the wireless network. In response to a communication request from a sender terminal, the access point 201 determines whether or not there is availability in the bandwidth and informs the bandwidth management unit 305 in the sender terminal of the determination result. The bandwidth management unit 305 controls the connected apparatuses based on the determination result.

Although the access point 201 manages the transmission quality and the bandwidth in this description, a particular wireless terminal may manage them.

In addition, although the transmission quality checking packets are transmitted by the wireless terminals to the access point, they may be transmitted by the access point to the wireless terminals, which may then measure the error rate and inform the access point of the result.

[Transmission Channel Assignment]

Now, using FIG. 1, description will be given of processing in the multiplex transmission system for ensuring the transmission quality of each transmission channel between the access point 201 and the wireless terminals 202 to 210 and assigning the transmission channels according to the content types.

By way of example, communications of video, voice, and data between the wireless terminals 202 to 204 via the access point 201 will be described here. Specifically, it is assumed that the following three communications are performed:

transmission of camera images from the HD camera 213 and the SD camera 215 connected to the wireless terminal 203 to the television 211 connected to the wireless terminal 202, a call between the telephone 214 connected to the wireless terminal 203 and the telephone 212 connected to the wireless terminal 202, and transfer of data from the PC 216 connected to the wireless terminal 203 to the PC 217 connected to the wireless terminal 204.

First, when the wireless terminal 203 start communications, the wireless terminal 203 requests the access point 201 to assign frequency channels. It is assumed that the transmission quality checking packets are periodically transmitted between the wireless terminals and the access point 201 using all frequency channels f1 to f3 to recognize which channel has a better transmission quality from the calculated error rate.

Generally, in wireless communications, factors such as conditions of buildings and the interference with external radio waves have different influences on the transmission quality depending on the frequency. In addition, the transmission quality is not fixed but constantly changing. Therefore, the wireless terminal 203 updates the ranking of the frequencies and the transmission quality on every arrival of the error rate information from the access point 201. It is assumed here that the frequency f1 has the highest transmission quality when the communication is desired, followed by the frequency f2 and then the frequency f3, with an increasing packet loss rate.

Thus, in this embodiment, the access point 201 monitors the error rate of the frequency channels f1 to f3 and, as shown in FIG. 5, assigns the frequency channels f1 to f3 as transmission quality guarantee levels 1 to 3.

According to the transmission quality guarantee levels, by way of example, the wireless terminal 203 sets the frequency f1 and the transmission bandwidth of 25 Mbps for the video 1 from the HD camera 213, and the frequency f2 and the transmission bandwidth of 1 Mbps for the voice from the telephone 214. The wireless terminal 203 also sets the frequency f2 and the transmission bandwidth of 5 Mbps for the video 2 from the SD camera 215, and the frequency f3 for the data from the PC 216. This information is transmitted to the access point 201 along with the sender address and the recipient addresses.

Here, the transmission bandwidth for the video 1 is requested for approval at the peak rate, while at the average rate for the voice and the video 2. The packet containing this information is input from the transmission quality recognition unit 304 to the input terminal IN5 in the multiplexing and switching unit 302 and is output from the output terminal OUT3 corresponding to a channel for transmitting management packets, for example a channel of the frequency f3. The packet is then transmitted via the protocol selection and processing unit 303, the coding and modulation unit 308, the RF unit 311, and the antenna 314.

The transmitted packet is received by the antenna 503 of the access point 201 and transferred to the network management unit 519 via the RF unit 506, the demodulation and decoding unit 512, the protocol processing unit 513, and the switching unit 514. The network management unit 519 manages the communication bandwidth of channels on which the video 1, voice, and video 2, which require at least real-timeness, are transmitted. On receiving the packet from the sender terminal, the network management unit 519 checks availability in the bandwidth in the wireless network and returns a return packet to grant communication permission if there is availability in the bandwidth and not to grant communication permission otherwise.

If there is availability in the bandwidth, the network management unit 519 generates a management packet containing communication permission information and outputs it to the input terminal IN4 in the switching unit 514. The management packet is then output to the output terminal OUT3 corresponding to a channel for transmitting management packets, for example a channel of the frequency f3. The management packet is transmitted via the protocol processing unit 515, the coding and modulation unit 518, the RF unit 509, and the antenna 503. The transmitted management packet is received by the antenna 403 of the wireless terminal 203 and transferred to the bandwidth management unit 305 via the RF unit 406, the demodulation and decoding unit 409, the protocol processing unit 410, and the switching unit 411.

If the wireless terminal 203 receives the communication permission information from the access point 201, the wireless terminal 203 can transmit information from the connected apparatuses 213 to 216. In transmission, the video 1 from the HD camera 213 is input from the input terminal #1 in the content type recognition unit 301, and the voice from the telephone 214 is input from the input terminal #2 in the content type recognition unit 301. The video 2 from the SD camera 215 is input from the input terminal #3, and the data from the PC 216 is input from the input terminal #4. These four pieces of information are output to the apparatus I/Fs 315 to 318, where they are converted into a certain signal format and output to the content type recognition unit 301.

The content type recognition unit 301 determines the type, transmission bandwidth, and real-timeness of input information. However, it is assumed here that these information items have been directly provided in advance from the connected apparatuses to the bandwidth management unit 305. Therefore, the input information is output to the multiplexing and switching unit 302 without processing. The multiplexing and switching unit 302 receives the inputs of the video 1, video 2, voice, and data from the content type recognition unit 301 and multiplexes the same type of information. Since the voice and video 2 input from the IN2 and IN3 are the same type of information among the four inputs (IN1, IN2, IN3, and IN4), they are multiplexed and output to the output terminal OUT2. The video 1 input from the IN1 is output to the output terminal OUT1, and the data input from the IN4 is output to the output terminal OUT3.

Next, the protocol selection and processing unit 303 selects protocols required for the input information and performs processing thereof. That is, the video 1 is processed according to UDP/MAC, the video 2 and voice are processed according to RTP/UDP/MAC, and the data is processed according to TCP/MAC. The signals subjected to these protocol processing are then subjected to coding such as scrambling and modulated according to various wireless schemes in the coding and modulation units 306 to 308. The RF units 309 to 311 set the frequencies of the signals from the coding and modulation units 306 to 308 to the assigned frequencies f1 to f3 under the control of the transmission quality recognition unit 304.

Here, the RF unit 309, through which the video 1 requiring the highest transmission quality is transmitted, is set to the frequency f1. The RF unit 310, through which the voice and video 2 requiring the second highest transmission quality are transmitted, is set to the frequency f2. The RF unit 311, through which the data is transmitted with the transmission quality guaranteed by the TCP protocol even if the transmission quality is low, is set to the frequency f3. The signals of the video 1, the video 2 and voice, and the data are transmitted as radio signals at the set frequencies f1 to f3 from the antennas 312 to 314 respectively.

It is assumed that transmission of the signal of the frequency f3 is performed when the frequency f3 is not used as determined by carrier sensing, rather than being started under the instruction of the bandwidth management unit 305.

The radio signals transmitted by the wireless terminal 203 are received by the antennas 501 to 503 of the access point 201, and the signals of the frequencies f1, f2, and f3 are extracted in the RF units 504 to 506 respectively. The demodulation and decoding units 510 to 512 demodulate and decode the modulated and coded signals and output the signals to the protocol processing unit 513. The protocol processing unit 513 performs protocol processing on the input signals. The switching unit 514 outputs the signals input from the input terminals IN1, IN2, and IN3 to the output terminals OUT1 to OUT3 corresponding to the recipients. The signals output to the output terminals OUT1 to OUT3 are subjected to protocol processing in the protocol processing unit 515 and coded and modulated in the coding and modulation units 516 to 518. The RF units 507 to 509 set the frequencies of the signals from the coding and modulation units 516 to 518 to the frequencies f1 to f3 respectively, and transmit the respective signals as radio signals from the antennas 501 to 503. The transmitted signals of the frequencies f1 and f2 are delivered to the wireless terminal 202, and the transmitted signals of the frequency f3 is delivered to the wireless terminals 204.

Thus, the signals of the frequencies f1 and f2 are received by the antennas 401 and 402 of the wireless terminal 202 and extracted in the RF units 404 and 405. These signals are demodulated and decoded in the demodulation and decoding units 407 and 408 and output to the protocol processing unit 410. The protocol processing unit 410 determines protocols applied to the input signals and performs processing thereof.

Here, the video 1 from the frequency channel f1 is subjected to UDP/MAC processing, and the video 2 and voice from the frequency channel f2 are subjected to RTP/UDP/MAC processing. The signals subjected to the protocol processing are output to the multiplexing and switching unit 411.

The multiplexing and switching unit 411 outputs the input signals to output terminals to which the intended apparatuses are connected. In this example, it is assumed that the television 211 is connected to the output terminal OUT2, and the telephone 212 is connected to the output terminal OUT3. Therefore, the signal of the video 1 input from the input terminal IN1 is output to the output terminal OUT2 and sent to the television 211, on which the video 1 is displayed. The voice and video 2 input from the input terminal IN2 are separated, so that the voice is sent to the telephone 212 connected to the output terminal OUT3, and the video 2 is sent to the television 211 connected to the output terminal OUT2.

Since the video 1 and the video 2 are output from the same output terminal, the user is supposed to switch the display so that one of them is displayed.

Voice from the telephone 212 is returned to the telephone 214 connected to the wireless terminal 203. Therefore, in a similar manner, the voice is transmitted at the frequency f2 to the wireless terminal 203 for conversation.

On the other hand, the data transmitted at the frequency f3 from the wireless terminal 203 is relayed at the access point 201 and received by the antenna 403 of the wireless terminal 204, where the signal is extracted in the RF unit 406. The signal is demodulated and decoded in the demodulation and decoding unit 409 and output to the protocol processing unit 410. The protocol processing unit 410 determines a protocol applied to the input signal and performs TCP/MAC processing. The signals subjected to the protocol processing are output to the multiplexing and switching unit 411. Since the PC 217 is connected to the output terminal OUT2 in this example, the data input from the input terminal IN3 is output to the output terminal OUT2 and sent to the PC 217.

While this embodiment is described by way of example for communications between two of the wireless terminals 202 to 204, the wireless terminals 205 to 210 may also communicate information such as the video 1, voice, and video 2. In that case, the network management unit 519 in the access point 201 is supposed to grant communication permission to the upper limit of the entire communication bandwidth.

FIG. 6 is a diagram showing a plurality of pieces of information multiplexed and transmitted between the access point and a plurality of wireless terminals.

The example shown in FIG. 6 illustrates that high-definition video 1 and 2 are communicated at the frequency f1, video 1 to 5 and control data are communicated at the frequency f2, and data 1 to 3 are communicated at the frequency f3.

Depending on the content types, congestion may occur in the switching unit 514. Since the voice and video 2 are assigned the transmission bandwidth at the average rate, part of the data will be discarded if the entire communication bandwidth is momentarily exceeded and a buffer in the switching unit 514 cannot hold data. On the other hand, since the video 1 is assigned the transmission bandwidth at the peak rate, the entire communication bandwidth will never be momentarily exceeded and the transmission quality will be maintained.

In this communication state, assume that errors occur on each transmission channel. The data on the transmission channel of the frequency f1 may be lost on a bit or packet basis due to occasional bit errors. However, a bit loss is not so significant as being noticed as an error. Even a packet loss can be addressed by means such as image correction, so that the HD video can be displayed without compromising the video quality. The transmission channel of the frequency f2 may have noises in the voice or noticeable disruption in the video due to rather many bit errors. However, such transmission quality can also be seen in the conventional telephony and television broadcasting and is therefore permissible. The transmission channel of the frequency f3 may have many bit errors and burst errors. However, since the TCP protocol is used for the data, the data is repeatedly retransmitted until it is correctly delivered. Taking much time to transmit the data allows a communication of high quality.

In this manner, optimal communications can be performed by selecting the transmission channels and protocols according to the content types. Since assignment of the transmission channels according to the transmission channel conditions and the content types is requested, transmission optimal in the actual environment can be performed. In addition, the limited transmission channels can be effectively used, so that many users can simultaneously communicate with required communication quality.

While this embodiment has been described for wireless communications by way of example, the present invention is not limited thereto but applicable to optical communications. For example, the present invention is applicable to optical wavelength multiplex communications in which a plurality of optical wavelengths are used to perform transmission by multiplexing in an optical fiber with those optical wavelengths.

Since the loss and dispersion of the optical fiber depends on the optical wavelength, transmitting over the same distance with different wavelengths result in different error rates. In addition, the life of optical components is shorter than electrical components, and their characteristics significantly change depending on the temperature. Therefore, the transmission quality of a transmission channel that uses a particular optical wavelength may be degraded. Applying the present invention to such systems allows optimal communications to be performed according to the content.

The present invention may be applied to a system composed of a plurality of devices (e.g., a host computer, an interface device, a reader, and a printer) or to an apparatus implemented as a single device (e.g., a copier or a facsimile machine).

It is to be understood that the objects of the present invention are achieved in such a manner that a recording medium storing program code of software for implementing the functions of the above-described embodiment is supplied to the system or apparatus, and a computer (CPU or MPU) in the system or apparatus reads out and executes the program code stored in the recording medium.

In this case, the program code itself read out from the recording medium implements the functions of the above-described embodiment, and the recording medium storing the program code constitutes the present invention.

Examples of the recording medium that may be used for providing the program code include a floppy (R) disk, hard disk, optical disk, magneto-optical disk, CD-ROM, CD-R, magnetic tape, nonvolatile memory card, and ROM.

It is to be understood that the present invention covers the case where the computer executes the read-out program code to implement the functions of the above-described embodiment, as well as the case where an OS (Operating System) or the like running on the computer performs part or all of actual processing under instructions of the program code to implement the functions of the above-described embodiment.

It is further to be understood that the present invention covers the case where after the program code read out from the recording medium is written to memory provided in a function extension board inserted into the computer or in a function extension unit connected to the computer, a CPU or the like provided in the function extension board or function extension unit performs part or all of actual processing under instructions of the program code to implement the functions of the above-described embodiment.

According to the present invention, content can be efficiently transmitted according to transmission channel conditions.

While the present invention has been described according to its preferred embodiment, the present invention is not limited to the described embodiment but various modifications can be made within the scope set forth in the claims.

This application claims the benefits of Japanese Patent Application No. 2006-027711, filed Feb. 3, 2006, which is hereby incorporated by reference herein in its entirety.

The invention claimed is:

1. A transmission system, comprising:
    a relay apparatus including:
        a detection unit configured to detect transmission quality of each of a plurality of transmission channels; and
        a transmission unit configured to transmit quality information related to a detected result by the detection unit; and
    a communication apparatus configured to wirelessly communicate with a second communication apparatus via the relay apparatus, wherein the communication apparatus includes:
        a connection unit configured to connect to a plurality of external apparatuses;
        a recognition unit configured to recognize transmission quality of each of the plurality of transmission channels based on quality information received from the relay apparatus;
        a first determination unit configured to determine a content type of each content input from each external apparatus via the connection unit;
        a second determination unit configured to determine transmission quality required on transmission of each content based on a content type; and
        a requesting unit configured to decide transmission channels to transmit each content input via the connection unit based on a transmission quality of each of the plurality of transmission channels recognized by the recognition unit, to decide transmission quality required on a transmission of each content having a transmission quality determined by the second determination unit, and to request the relay apparatus to assign decided transmission channels.

2. The transmission system according to claim 1, wherein the plurality of transmission channels comprises channels divided in terms of frequency.

3. The transmission system according to claim 1, wherein the plurality of transmission channels comprises channels divided in terms of optical wavelength.

4. The transmission system according to claim 1, wherein the detection unit is configured to detect transmission quality by measuring an error rate for each of the plurality of transmission channels.

5. The transmission system according to claim 1, wherein the detection unit is configured to detect an error rate from a log of past communications.

6. The transmission system according to claim 1, wherein the detection unit is configured to measure an error rate by transmitting an error rate measuring packet to all transmission channels.

7. The transmission system according to claim 1, wherein the relay apparatus is configured to assign a requested transmission channel if the requested transmission channel has an available transmission bandwidth.

8. The transmission system according to claim 1, wherein the first determination unit is configured to classify content types into at least content requiring real time communication and a wide transmission bandwidth, content requiring real time communication and a narrow transmission bandwidth, and content requiring no real time communication.

9. The transmission system according to claim 1, further comprising a selection unit configured to select a communication protocol for each content based on a content type determined by the first determination unit.

10. The transmission system according to claim 1, wherein the requesting unit is configured to request a transmission rate appropriate for each content.

11. The transmission system according to claim 10, wherein the transmission rate comprises a peak rate or an average rate.

* * * * *